(12) United States Patent
Kirby et al.

(10) Patent No.: US 8,185,041 B2
(45) Date of Patent: May 22, 2012

(54) METHOD AND SYSTEM FOR MOBILE VEHICLE CONTENT MANAGEMENT

(75) Inventors: John Kirby, San Antonio, TX (US); Michael Raftelis, San Antonio, TX (US); Edward Walter, Boerne, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 869 days.

(21) Appl. No.: 11/800,350

(22) Filed: May 4, 2007

(65) Prior Publication Data

US 2008/0274688 A1 Nov. 6, 2008

(51) Int. Cl.
*H04H 20/74* (2008.01)

(52) U.S. Cl. ............ 455/3.02; 455/3.01; 455/3.06; 455/432.1; 455/436; 725/62; 725/63; 725/74

(58) Field of Classification Search .......... 725/62–63, 725/74–76; 455/3.01–3.06, 432.1, 436–444
See application file for complete search history.

(56) References Cited

U.S. PATENT DOCUMENTS

| | | |
|---|---|---|
| 6,760,757 B1 | 7/2004 | Lundberg et al. |
| 6,799,201 B1 | 9/2004 | Lee et al. |
| 6,813,777 B1 | 11/2004 | Weinberger et al. |
| 6,928,270 B2 | 8/2005 | Tighe |
| 7,047,039 B2 | 5/2006 | Lalley |
| 2004/0204047 A1 | 10/2004 | Steed |
| 2004/0255331 A1* | 12/2004 | Inoue et al. .......... 725/118 |
| 2006/0089754 A1 | 4/2006 | Mortenson |
| 2006/0119748 A1 | 6/2006 | Vitito |
| 2007/0022446 A1* | 1/2007 | Arseneau et al. ........ 725/74 |
| 2007/0050820 A1* | 3/2007 | Saarikivi et al. ........ 725/62 |
| 2008/0130886 A1* | 6/2008 | Kocher et al. ........ 380/201 |
| 2009/0252070 A1* | 10/2009 | Connors et al. ........ 370/311 |
| 2009/0320077 A1* | 12/2009 | Gazdzinski ........ 725/62 |

FOREIGN PATENT DOCUMENTS

| | | |
|---|---|---|
| EP | 1329814 | 7/2003 |
| JP | 2005277641 | 10/2005 |

* cited by examiner

*Primary Examiner* — Fayyaz Alam
(74) *Attorney, Agent, or Firm* — Yudell Isidore Ng Russell PLLC

(57) ABSTRACT

A method and system for mobile vehicle content management. Content may be received wireless from a plurality of access technologies within a mobile vehicle. The content may be balanced from the plurality of access technologies to select the content from at least one access technology for decryption. The selected content may be provided to a receiver device for presentation.

16 Claims, 7 Drawing Sheets

METHOD AND SYSTEM FOR MOBILE VEHICLE CONTENT MANAGEMENT

FIELD

This application relates to a method and system for communication, and more specifically to systems and methods for providing mobile vehicle content management.

BACKGROUND

Video content tends to be played in mobile vehicles (e.g., cars) via an entertainment system from a removable medium such as digital versatile disc (DVD) or a video cassette recorder (VCR) tape. Removable media are susceptible to problems from ordinary use, since they may get lost, worn, or warped due to conditions inside the mobile vehicle. In addition, repeated viewing of the same removable medium on an entertainment system may eventually bore some viewers.

Some entertainment systems may be capable of receiving live video content from a satellite transmission source. These entertainment systems tend to be expensive in both initial cost and ongoing subscription fees, and the received live video content may be limited to being received from a single provider (e.g., the entity receiving the ongoing subscription fees). Additionally, the capabilities of these entertainment systems are limited, as the data content used for viewing web pages and conducting electronic mail sessions may not be received and sent through the satellite transmission source.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for mobile vehicle content management are described. In the following description, for purposes of explanation, numerous specific details are set forth in order to provide a thorough understanding of example embodiments. It will be evident, however, to one skilled in the art that the present invention may be practiced without these specific details.

In an example embodiment, content may be wirelessly received from a plurality of access technologies within a mobile vehicle. The received content may be buffered. The buffered content may be balanced from the plurality of access technologies to select the content from at least one access technology. The selected content may be provided to a receiver device for presentation.

In an example embodiment, content may be wirelessly received from a plurality of access technologies within a mobile vehicle. The content may be balanced from the plurality of access technologies to select the content from at least one access technology for decryption. The selected content may be provided to a receiver device for presentation.

Figure 1:
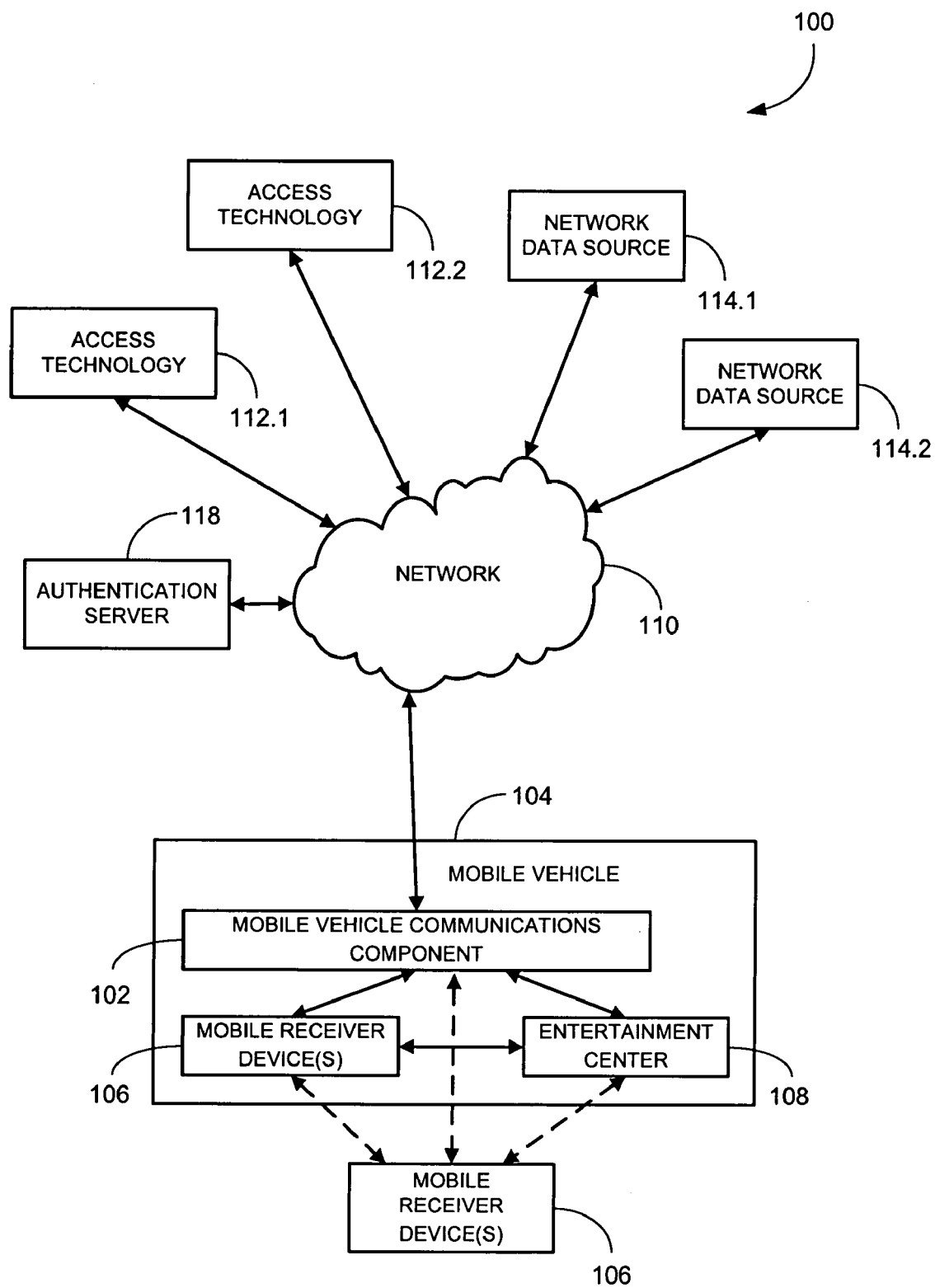
FIG. 1 is an example content system.

FIG. 1 illustrates an example content system 100. The content system 100 includes a mobile vehicle communications component 102 located inside a mobile vehicle 104. The mobile vehicle 104 may be an automobile, a boat or other vehicle.

The mobile vehicle communications component 102 may communicate with and provide content to one or more receiver devices including an entertainment center 108, one or more mobile receiver devices 106 located inside the mobile vehicle 104, and/or one or more mobile receiver devices 106 located outside the mobile vehicle 104 in proximity to the mobile vehicle 104. An example embodiment of the mobile vehicle communications component 102 is described in greater detail below.

The mobile vehicle communications component 102 may unicast content to a single receiver device 106, 108 and/or multicast content to a plurality of receiver devices 106, 108. The mobile receiver devices 106 may be a mobile phone, a television, a personal digital assistant (PDA), or another mobile vehicle communications component 102 located inside another mobile vehicle. The receiver devices 106, 108 may include a wireless receiver such as a BLUETOOTH device and/or a wired connection such as an RJ-45 connection to receive the content from the mobile vehicle communications component 102.

The content provided by the mobile vehicle communications component 102 may be public content or private content. The public content may be provided at a best-effort quality, while the private content may be part of a managed solution to provide the content at a higher quality (e.g., than best-effort quality). The managed solution may include, by way of an example, a walled garden of internet protocol television (IPTV) space, a core application, and a video service.

The content may be video content or data content; however other types of content may also be used. The video content may be streaming video that may ultimately be presented to a viewer, while the data content may be data used for web pages, electronic e-mail, and the like. For example, video content may include intended content for an area in which the mobile vehicle 104 is currently located, from an area in which the mobile vehicle 104 originated, content intended for areas selected by the viewers, and the like. The content may be in Internet Protocol (IP) format to enable, for example, IPTV data to be streamed to one or more receiver devices 106, 108. However, other formats in which content may be compressed and/or streamed may also be used.

The mobile vehicle communications component 102 may communicate with the entertainment center 108 in the mobile vehicle to provide content to one or more viewers and receive a content selection from a viewer. The entertainment center 108 may include an IPTV mobile terminator tuner, a game counsel, a keyboard, a display, a DVD player, a headset, and the like to provide the content to one or multiple viewers inside the mobile vehicle 104.

The content may be received by the mobile vehicle communications component 102 over a network 110 from one or more access technologies 112.1, 112.2. The access technologies 112.1, 112.2 may include, by way of example, a mobile phone, a mobile vehicle communication source, WiFi source, a Wi-MAX source, a satellite communication source, and/or a cellular communication source. Other technologies capable of providing the mobile vehicle communications component 102 with access to content may also be used. By way of an example, video content may be received from a mobile phone available within the mobile vehicle 104 and/or directly from one or more cellular towers.

The network 110 over which content is provided may be a Global System for Mobile Communications (GSM) network, an Internet Protocol (IP) network, a Wireless Application Protocol (WAP) network, and/or a Wifi network. Other networks may also be used.

For certain access technologies 112.1, 112.2, content may be received over the network 110 from a plurality of network data sources 114.1, 114.2. The plurality of network data sources 114.1, 114.2 may be data communication towers in a geographic region such as cellular towers. The plurality of network data sources 114.1, 114.2 may be used to provide access to the content in the geographic area. By way of an example, the plurality of network data sources 114.1, 114.2 may each have a cellular footprint over which content may be provided.

Once content is received from the mobile vehicle communications components 102, the receiver devices 106, 108 may unicast or multicast the content to other receiver devices 106, 108 and/or a mobile vehicle communications component 102 located in another mobile vehicle 104.

An authentication server 118 may available over the network 110 and/or internally to an access technology 112 and may be used to receive and process an authentication request from the mobile vehicle communications component 102.

Figure 2:
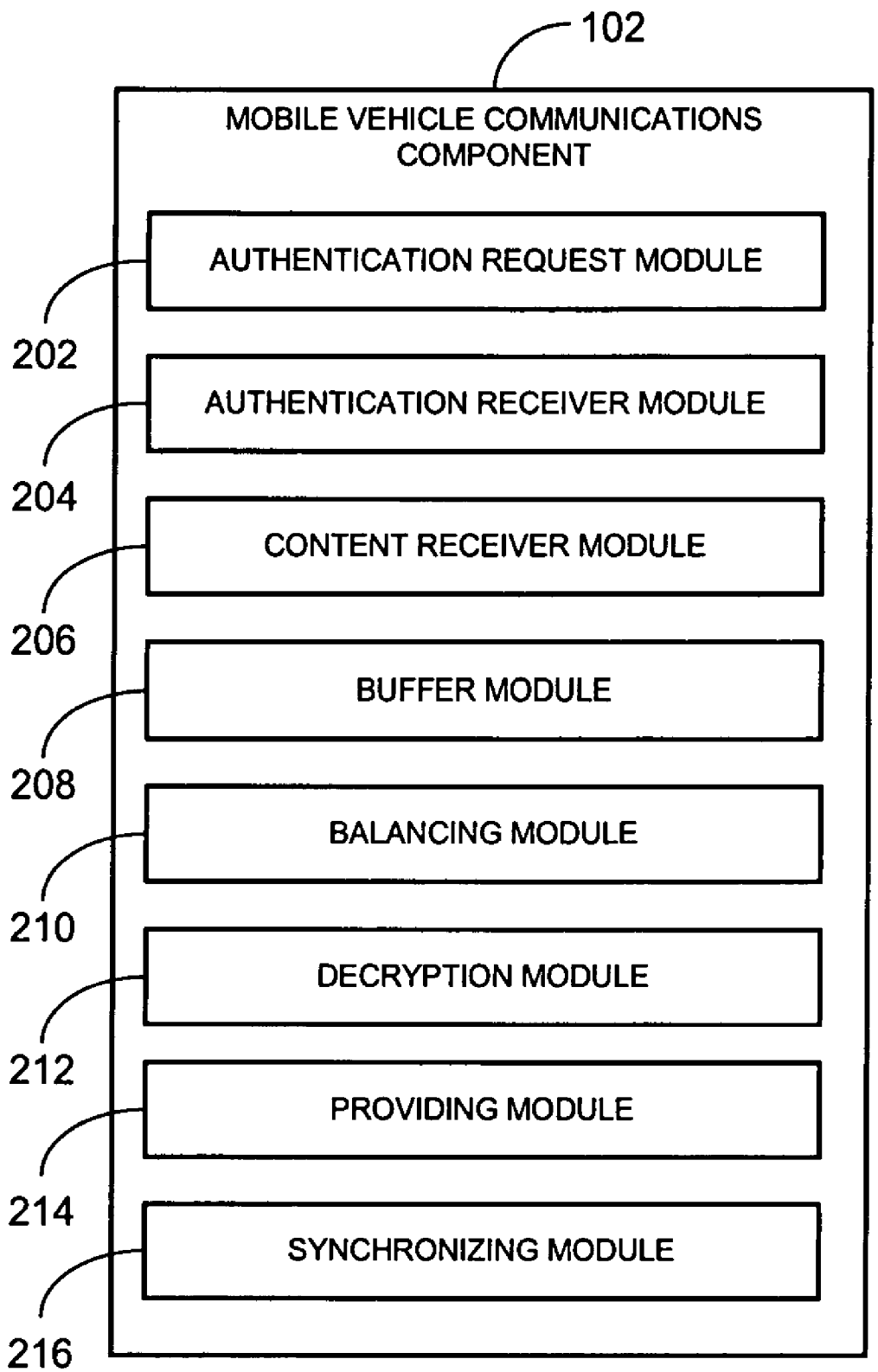
FIG. 2 is an example mobile vehicle communications component.

FIG. 2 illustrates an example mobile vehicle communications component 102 (see FIG. 1) that may deployed in the content system 100. However, the mobile vehicle communications component 102 may also be deployed in other systems.

The mobile vehicle communications component 102 may include an authentication request module 202, an authentication receiver module 204, a content receiver module 206, a buffer module 208, a balancing module 210, a decryption module 212, a providing module 214, and/or a synchronizing module 216. Other modules may also be used.

The authentication request module 202 is configured to provide an authentication request to an authentication server 118 (see FIG. 1). The authentication receiver module 204 is configured to receive an indication of authentication from the authentication server 118 in response to the authentication request (e.g., when the mobile vehicle communications component is authorized to receive the content for which it request authorization).

The content receiver module 206 is configured to wirelessly receive content in the mobile vehicle 104 from a plurality of access technologies 112.1, 112.2 and/or a plurality of network data sources 114.1, 114.2 (e.g., of one or more access technologies 112.1, 112.2) within the network 110. The buffer module 208 is configured to buffer the received content from the plurality of access technologies 112.1, 112.2 and/or the plurality of network data sources 114.1, 114.2.

The balancing module 210 is configured to balance the content from the plurality of access technologies 112.1, 112.2 to select the content from at least one access technology 112 and/or balance the buffered content from the plurality of network data sources 114.1, 114.2 to select the buffered content from at least one network data source 114.

The decryption module 212 is configured to decrypt the selected content of the at least one access technology 112 and/or the at least one network data source 114. The providing module 214 is configured to provide the selected content or decrypted content to the receiver device 106, 108 for presentation.

The synchronizing module 216 is configured to synchronize the buffered content of a second access technology 112.2 with the buffered content of a first access technology 112.1 of the plurality of access technologies.

Figure 3:
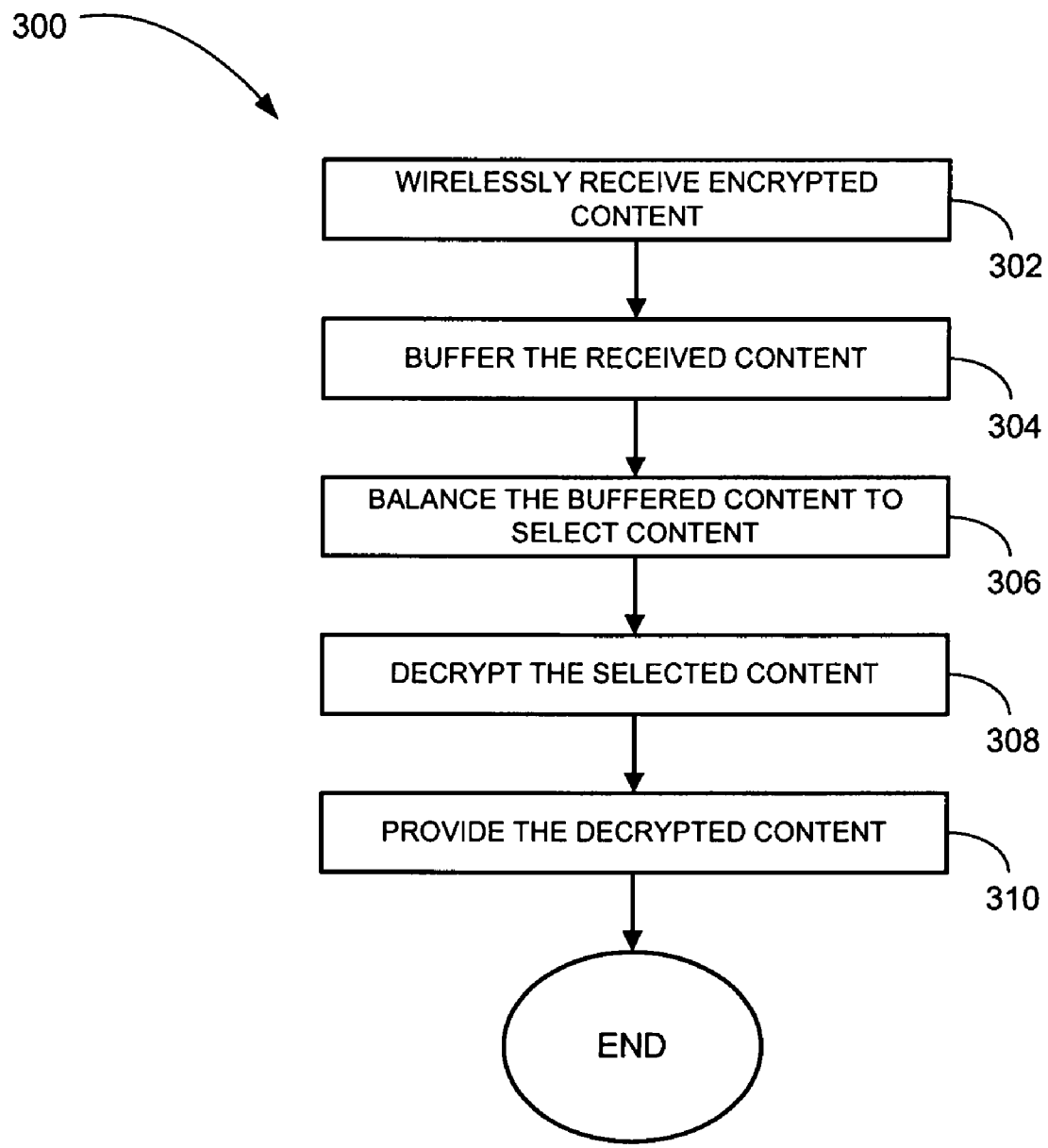
FIGS. 3-5 are flowcharts illustrating methods for managing content in accordance with example embodiments.

FIG. 3 illustrates a method 300 for managing content according to an example embodiment. In an example embodiment, the method 300 may be performed by the mobile vehicle communications component 102 (see FIG. 1); however it may also be performed by another component.

The content may be wirelessly received from a plurality of access technologies 112.1, 112.2 in the mobile vehicle 104 at block 302. The content received from the plurality of access technologies 112.1, 112.2 may be the same content or different content. By way of an example, multiple access technologies 112.1, 112.2 may provide video content of a same sporting event at the same or different qualities, or may provided video content of a concert and provide data content of web pages of a particular web site. The received content from the plurality of access technologies 112.1, 112.2 may be buffered at block 304.

The content may be balanced from the plurality of access technologies 112.1, 112.2 at block 306 to select the buffered content from at least one access technology 112 for decryption. The balancing of the content may enable the content to ultimately be provided from the mobile vehicle 104 since the mobile vehicle 104 may be moving in a geographic region and thereby use a different selection of an access technology 112 based on a geographic location of the mobile vehicle 104 in the geographic region. The balancing may enable a seamless transition (e.g., with little or no packet loss) from the content provided by a first access technology 112 to the content provided by a second access technology 112. The selected content may be decrypted at block 308.

The selected content may be provided to one or more receiver devices 106, 108 for presentation at block 310.

Figure 4:
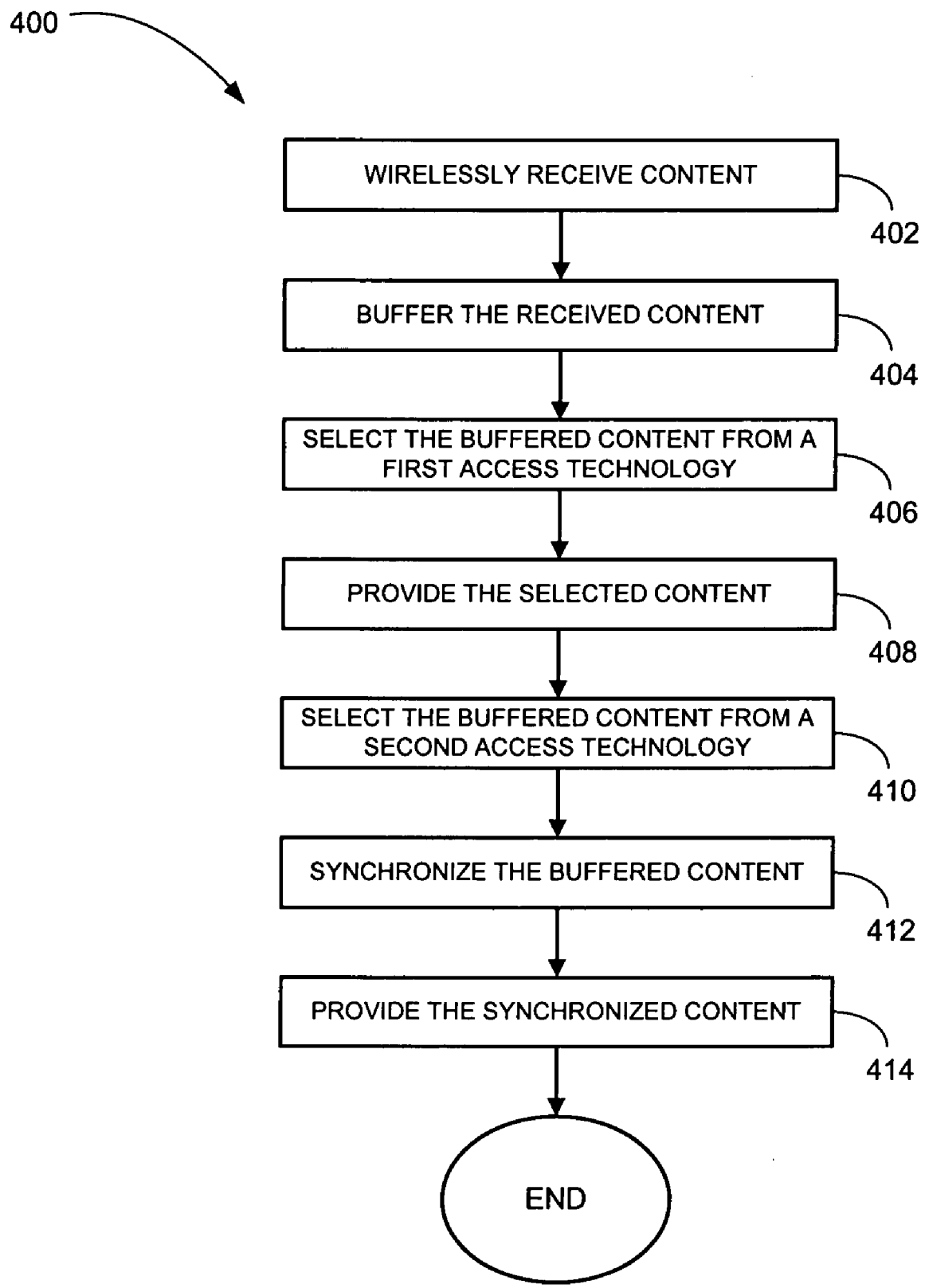

FIG. 4 illustrates a method 400 for managing content according to an example embodiment. In an example embodiment, the method 400 may be performed by the mobile vehicle communications component 102 (see FIG. 1); however it may also be performed by another component.

The content may be wireless received from a plurality of access technologies 112.1, 112.2 in the mobile vehicle 104 at block 402. The received content from the plurality of access technologies 112.1, 112.2 may be buffered at block 404. The buffered content may be selected from a first access technology 112 of the plurality of access technologies 112.1., 112.2 at block 406.

In an example embodiment, the buffered content may be selected from a first access technology 112 based on at least one access factor from the plurality of access technologies 112.1, 112.2. The access factors may include, by way of example, signal strength indication, a capability of the receiver device 106, 108, or an available bandwidth indication. Other access factors may also be used.

The selected content may be provided to the received device 106, 108 at block 408.

The buffered content may be selected from a second access technology 112 of the plurality of access technologies 112.1, 112.2 at block 410. The selection of a different access technology 112 may be based on an access factor or another factor such as source availability.

The buffered content of the second access technology 112.1 may be synchronized with the buffered content of the first access technology 112.2 at block 412. The synchronized content of the second access technology may be provided to the receiver device 106, 108 for presentation at block 414. The synchronization of the content may prevent a viewer from loosing a portion of the content stream, thereby enabling the viewer to enjoy the content without significant interruption when switching between providing the content of the first access technology and the second access technology.

By way of an example, the method 400 may be used to first provide content from a cellular source and then may seamlessly transition to provide content from a satellite source or a second cellular source.

Figure 5:
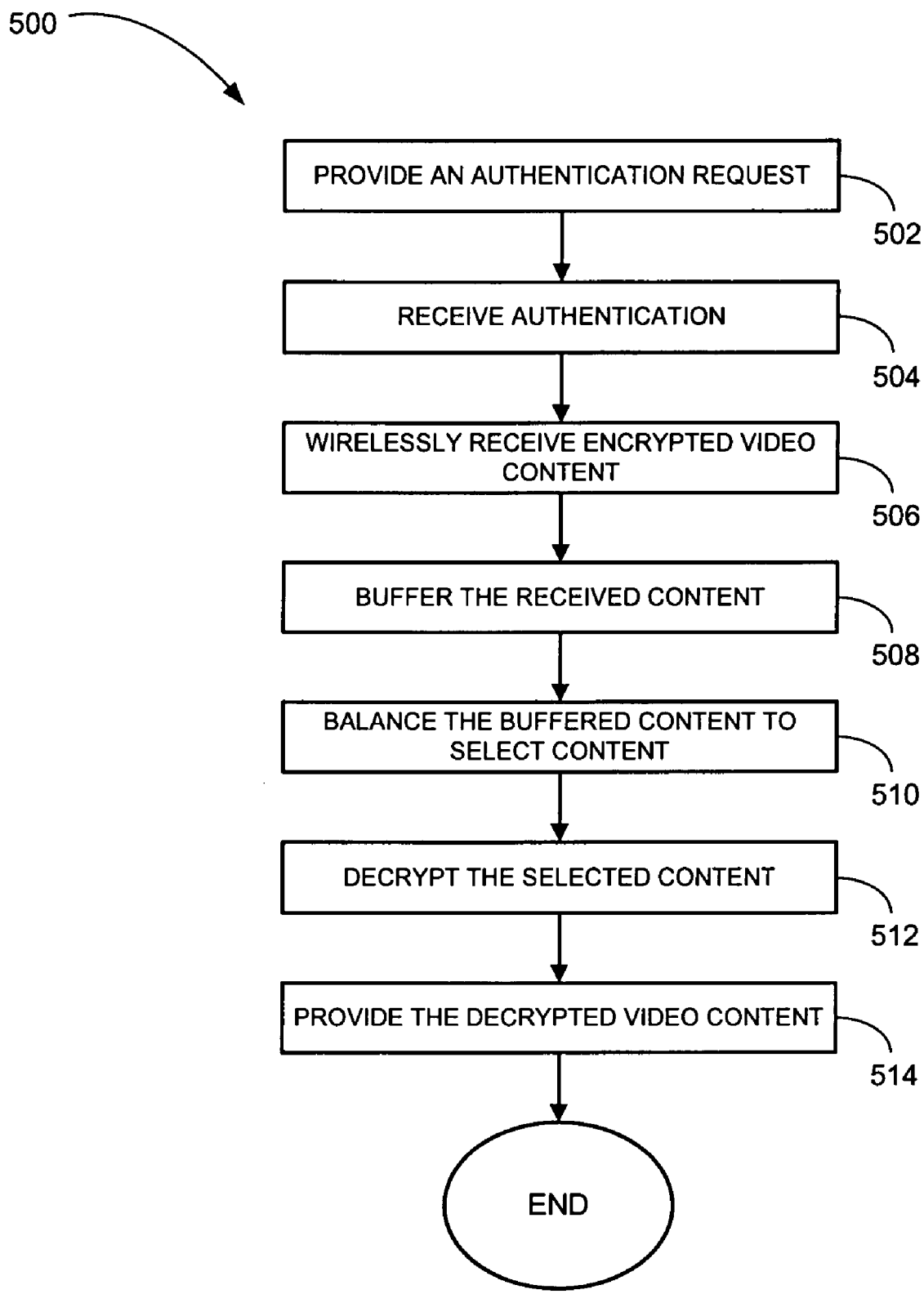

FIG. 5 illustrates a method 500 for managing content according to an example embodiment. In an example embodiment, the method 500 may be performed by the mobile vehicle communications component 102 (see FIG. 1); however it may also be performed by another component.

An authentication request may be provided to an authentication server 118 at block 502. An indication of authentication may be received from the authentication server 118 in response to the authentication request at block 504.

Encrypted video content may be wirelessly received in the mobile vehicle 104 from a plurality of network data sources 114.1, 114.2 within the network 110 at block 506. The received content from the plurality of network data sources 114.1, 114.2 may be buffered at block 508.

The buffered content may be balanced from the plurality of network data sources 114.1, 114.2 to select the buffered content from at least one network data source 114 at block 510. The balancing may enable a seamless transition from the content provided by a first network data source 114.1 to the content provided by a second network data source 114.2 when the mobile vehicle 104 is moving within a geographic region. For example, the signal strength of the first network data source 114.1 and the second network data source 114.2 may vary based on a geographic location of the mobile vehicle 104 in the geographic region and the balancing performed during the operations at block 510 may enable the content to be effectively provided according to the access technology 112 associated with the network data sources 114.1, 114.2.

In an example embodiment, the buffered content may be selected from a first network data source 114.1 based on at least one network factor associated with receiving content from the plurality of network data sources 114.1, 114.2. The at least one network factor may include, by way of an example, signal strength indication, available bandwidth indication, and/or proximity to a particular network data source 114. Other network factors may also be used.

The selected content of the at least one network data source 114 may be decrypted at block 512. The decrypted video content may be provided to the receiver device 106, 108 for presentation at block 514. The decrypted video content may be provided wired or wirelessly.

A number of pixels in the decrypted video content may optionally be reduced and the reduced video content may be provided to the receiver device 106, 108 for presentation. The reduction of the number of pixels may optimize the amount of bandwidth available between the mobile vehicle communications component 102 and the receiver device 106, 108.

In an example embodiment, the mobile vehicle communications component 102 may enable one or more receiver devices 106, 108 to leverage functionality of a mobile phone available within and/or near the mobile vehicle 104 to receive content.

Figure 6:
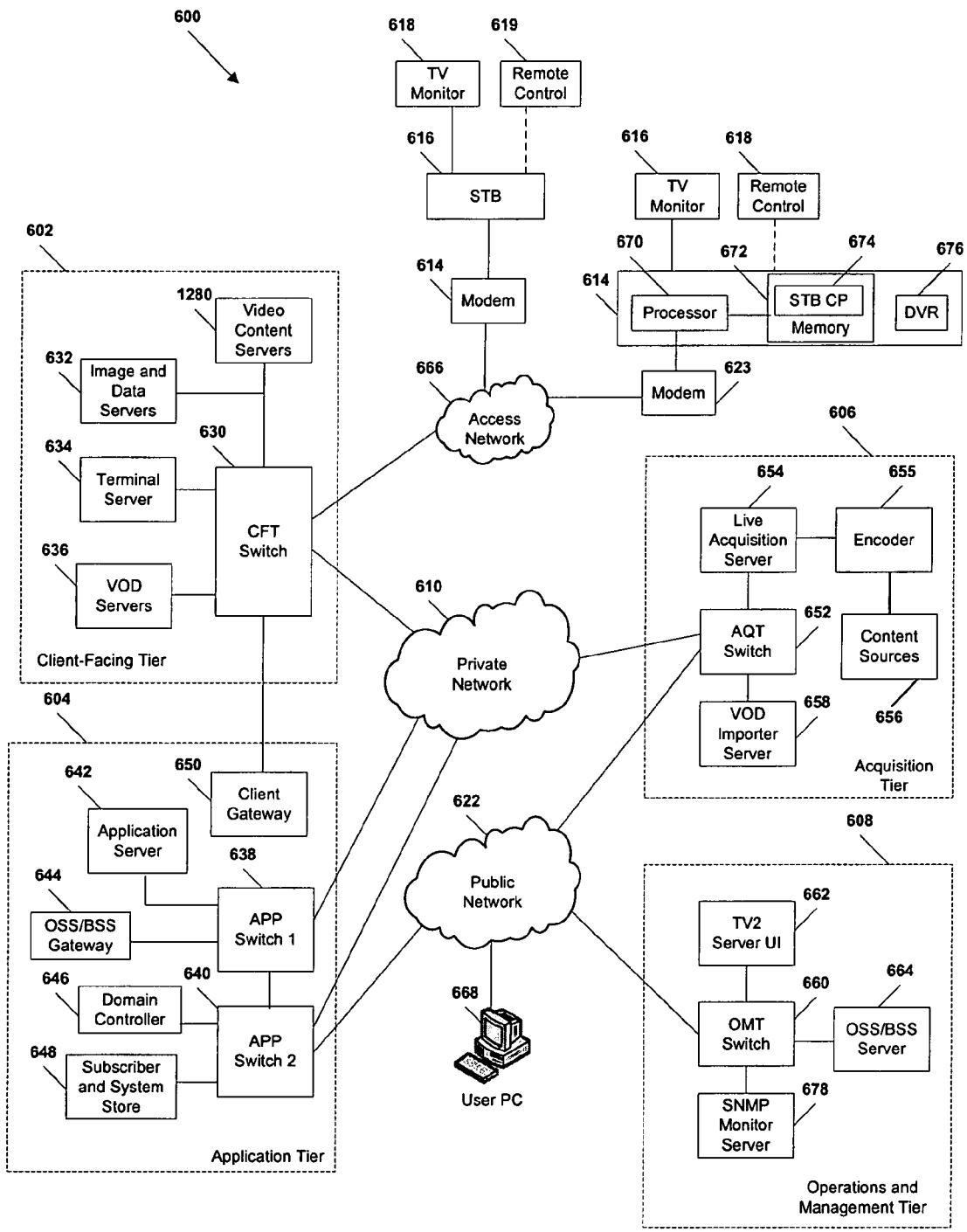
FIG. 6 is a block diagram of an IPTV system in accordance with an example embodiment.

FIG. 6 illustrates an example embodiment of an Internet Protocol Television (IPTV) system 600 in which the content system 100 (see FIG. 1) may be deployed and/or the methods 300-500 (see FIGS. 3-5) may be used to receive content. For example, a client facing tier 602, an application tier 604, an acquisition tier 606, and an operations and management tier 608 of the IPTV system 600 may represent an example access technology 112 and/or authentication server 118. However, the content system 100 may be deployed in other types of IPTV and non-IPTV video systems, and the methods 300-500 may be used in other systems.

The system 600 as illustrated may include the client facing tier 602, the application tier 604, the acquisition tier 606, and the operations and management tier 608. Each tier 602, 604, 606, 608 is coupled to a private network 610; to a public network 622, such as the Internet; or to both the private network 610 and the public network 622. For example, the client-facing tier 602 may be coupled to the private network 610. Further, the application tier 604 may be coupled to the private network 610 and to the public network 622. The acquisition tier 606 may also be coupled to the private network 610 and to the public network 622. Additionally, the operations and management tier 608 may be coupled to the public network 622.

As illustrated in FIG. 6, the various tiers 602, 604, 606, 608 communicate with each other via the private network 610 and the public network 622. For instance, the client-facing tier 602 may communicate with the application tier 604 and the acquisition tier 606 via the private network 610. The application tier 604 may also communicate with the acquisition tier 606 via the private network 610. Further, the application tier 604 may communicate with the acquisition tier 606 and the operations and management tier 608 via the public network 622. Moreover, the acquisition tier 606 may communicate with the operations and management tier 608 via the public network 622. In a particular embodiment, elements of the application tier 604, including, but not limited to, a client gateway 650, may communicate directly with the client-facing tier 602.

As illustrated in FIG. 6, the client-facing tier 602 may communicate with user equipment via a private access network 666, such as an Internet Protocol Television (IPTV) access network. In an illustrative embodiment, modems, such as a first modem 614 and a second modem 613 may be coupled to the private access network 666. The client-facing tier 602 may communicate with a first representative set-top box device 616 via the first modem 614 and with a second representative set-top box device 614 via the second modem 612. The client-facing tier 602 may communicate with a large number of set-top boxes, such as the representative set-top boxes 616, 614, over a wide geographic area, such as a regional area, a metropolitan area, a viewing area, a designated market area or any other suitable geographic area, market area, or subscriber or customer group that may be supported by networking the client-facing tier 602 to numerous set-top box devices. In an illustrative embodiment, the client-facing tier, or any portion thereof, may be included at a video head-end office.

In a particular embodiment, the client-facing tier 602 may be coupled to the modems 614, 613 via fiber optic cables. Alternatively, the modems 614 and 613 may be digital subscriber line (DSL) modems that are coupled to one or more network nodes via twisted pairs, and the client-facing tier 602 may be coupled to the network nodes via fiber-optic cables. Each set-top box device 616, 614 may process data received via the private access network 666, via an IPTV software platform, such as Microsoft® TV IPTV Edition. In another embodiment, representative set-top boxes 616, 614 may receive data from private access network 666 through RF and other cable and/or satellite based networks.

Additionally, the first set-top box device 616 may be coupled to a first external display device, such as a first television monitor 618, and the second set-top box device 614 may be coupled to a second external display device, such as a second television monitor 616. Moreover, the first set-top box device 616 may communicate with a first remote control 619, and the second set-top box device may communicate with a second remote control 618.

In an example, non-limiting embodiment, each set-top box device 616, 614 may receive video content, which may include video and audio portions, from the client-facing tier 602 via the private access network 666. The set-top boxes 616, 614 may transmit the video content to an external display device, such as the television monitors 618, 616. Further, the set-top box devices 616, 614 may each include a STB processor, such as STB processor 670, and a STB memory device, such as STB memory 672, which is accessible to the STB processor 670. In one embodiment, a computer program, such as the STB computer program 674, may be embedded within the STB memory device 672. Each set-top box device 616, 614 may also include a video content storage module, such as a digital video recorder (DVR) 676. In a particular embodiment, the set-top box devices 616, 614 may communicate commands received from the remote control devices 619, 618 to the client-facing tier 602 via the private access network 666.

In an illustrative embodiment, the client-facing tier 602 may include a client-facing tier (CFT) switch 630 that manages communication between the client-facing tier 602 and the private access network 666 and between the client-facing tier 602 and the private network 610. As shown, the CFT switch 630 is coupled to one or more image and data servers 632 that store still images associated with programs of various IPTV channels. The image and data servers 632 may also store data related to various channels, e.g., types of data related to the channels and to programs or video content displayed via the channels. In an illustrative embodiment, the image and data servers 632 may be a cluster of servers, each of which may store still images, channel and program-related data, or any combination thereof. The CFT switch 630 may also be coupled to a terminal server 634 that provides terminal devices with a connection point to the private network 610. In a particular embodiment, the CFT switch 630 may also be coupled to one or more video-on-demand (VOD) servers 636 that store or provide VOD content imported by the IPTV system 600. In an illustrative, non-limiting embodiment, the VOD content servers 680 may include one or more unicast servers.

The client-facing tier 602 may also include one or more video content servers 680 that transmit video content requested by viewers via their set-top boxes 616, 614. In an illustrative, non-limiting embodiment, the video content servers 680 may include one or more multicast servers.

As illustrated in FIG. 6, the application tier 604 may communicate with both the private network 610 and the public network 622. The application tier 604 may include a first application tier (APP) switch 638 and a second APP switch 640. In a particular embodiment, the first APP switch 638 may be coupled to the second APP switch 640. The first APP switch 638 may be coupled to an application server 642 and to an OSS/BSS gateway 644. In a particular embodiment, the application server 642 may provide applications to the set-top box devices 616, 614 via the private access network 666, which enable the set-top box devices 616, 614 to provide functions, such as display, messaging, processing of IPTV data and VOD material, etc. In a particular embodiment, the OSS/BSS gateway 644 includes operation systems and support (OSS) data, as well as billing systems and support (BSS) data. In one embodiment, the OSS/BSS gateway may provide or restrict access to an OSS/BSS server 664 that stores operations and billing systems data.

Further, the second APP switch 640 may be coupled to a domain controller 646 that provides web access, for example, to users via the public network 622. For example, the domain controller 646 may provide remote web access to IPTV account information via the public network 622, which users may access using their personal computers 668. The second APP switch 640 may be coupled to a subscriber and system store 648 that includes account information, such as account information that is associated with users who access the system 600 via the private network 610 or the public network 622. In a particular embodiment, the application tier 604 may also include a client gateway 650 that communicates data directly with the client-facing tier 602. In this embodiment, the client gateway 650 may be coupled directly to the CFT switch 630. The client gateway 650 may provide user access to the private network 610 and the tiers coupled thereto.

In a particular embodiment, the set-top box devices 616, 614 may access the IPTV system 600 via the private access network 666, using information received from the client gateway 650. In this embodiment, the private access network 666 may provide security for the private network 610. User devices may access the client gateway 650 via the private access network 666, and the client gateway 650 may allow such devices to access the private network 610 once the devices are authenticated or verified. Similarly, the client gateway 650 may prevent unauthorized devices, such as hacker computers or stolen set-top box devices from accessing the private network 610, by denying access to these devices beyond the private access network 666.

For example, when the first representative set-top box device 616 accesses the system 600 via the private access network 666, the client gateway 650 may verify subscriber information by communicating with the subscriber and system store 648 via the private network 610, the first APP switch 638, and the second APP switch 640. Further, the client gateway 650 may verify billing information and status by communicating with the OSS/BSS gateway 644 via the private network 610 and the first APP switch 638. In one embodiment, the OSS/BSS gateway 644 may transmit a query across the first APP switch 638, to the second APP switch 640, and the second APP switch 640 may communicate the query across the public network 622 to the OSS/BSS server 664. After the client gateway 650 confirms subscriber and/or billing information, the client gateway 650 may allow the set-top box device 616 access to IPTV content and VOD content. If the client gateway 650 is unable to verify subscriber information for the set-top box device 616, e.g., because it is connected to an unauthorized twisted pair, the client gateway 650 may block transmissions to and from the set-top box device 616 beyond the private access network 666.

As indicated in FIG. 6, the acquisition tier 606 includes an acquisition tier (AQT) switch 652 that communicates with the private network 610. The AQT switch 652 may also communicate with the operations and management tier 608 via the public network 622. In a particular embodiment, the AQT switch 652 may be coupled to a live acquisition server 654 that receives television or movie content, for example, from content sources 656 through an encoder 655. In a particular embodiment during operation of the IPTV system, the live acquisition server 654 may acquire television or movie content. The live acquisition server 654 may transmit the television or movie content to the AQT switch 652 and the AQT switch 652 may transmit the television or movie content to the CFT switch 630 via the private network 610.

Further, the television or movie content may be transmitted to the video content servers 680, where it may be encoded, formatted, stored, or otherwise manipulated and prepared for communication to the set-top box devices 616, 614. The CFT switch 630 may communicate the television or movie content to the modems 614, 613 via the private access network 666. The set-top box devices 616, 614 may receive the television or movie content via the modems 614, 613, and may transmit the television or movie content to the television monitors 618, 616. In an illustrative embodiment, video or audio portions of the television or movie content may be streamed to the set-top box devices 616, 614.

Further, the AQT switch may be coupled to a video-on-demand importer server 658 that stores television or movie content received at the acquisition tier 606 and communicates the stored content to the VOD server 636 at the client-facing tier 602 via the private network 610. Additionally, at the acquisition tier 606, the video-on-demand (VOD) importer server 658 may receive content from one or more VOD sources outside the IPTV system 600, such as movie studios and programmers of non-live content. The VOD importer server 658 may transmit the VOD content to the AQT switch 652, and the AQT switch 652, in turn, may communicate the material to the CFT switch 630 via the private network 610. The VOD content may be stored at one or more servers, such as the VOD server 636.

When user issue requests for VOD content via the set-top box devices 616, 614, the requests may be transmitted over the private access network 666 to the VOD server 636, via the CFT switch 630. Upon receiving such requests, the VOD server 636 may retrieve the requested VOD content and transmit the content to the set-top box devices 616, 614 across the private access network 666, via the CFT switch 630. The set-top box devices 616, 614 may transmit the VOD content to the television monitors 618, 616. In an illustrative embodiment, video or audio portions of VOD content may be streamed to the set-top box devices 616, 614.

FIG. 6 further illustrates that the operations and management tier 608 may include an operations and management tier (OMT) switch 660 that conducts communication between the operations and management tier 608 and the public network 622. In the embodiment illustrated by FIG. 1, the OMT switch 660 is coupled to a TV2 server 662. Additionally, the OMT switch 660 may be coupled to an OSS/BSS server 664 and to a simple network management protocol (SNMP) monitor 670 that monitors network devices within or coupled to the IPTV system 600. In a particular embodiment, the OMT switch 660 may communicate with the AQT switch 652 via the public network 622.

In an illustrative embodiment, the live acquisition server 654 may transmit the television or movie content to the AQT switch 652, and the AQT switch 652, in turn, may transmit the television or movie content to the OMT switch 660 via the public network 622. In this embodiment, the OMT switch 660 may transmit the television or movie content to the TV2 server 662 for display to users accessing the user interface at the TV2 server 662. For example, a user may access the TV2 server 662 using a personal computer (PC) 668 coupled to the public network 622.

Figure 7:
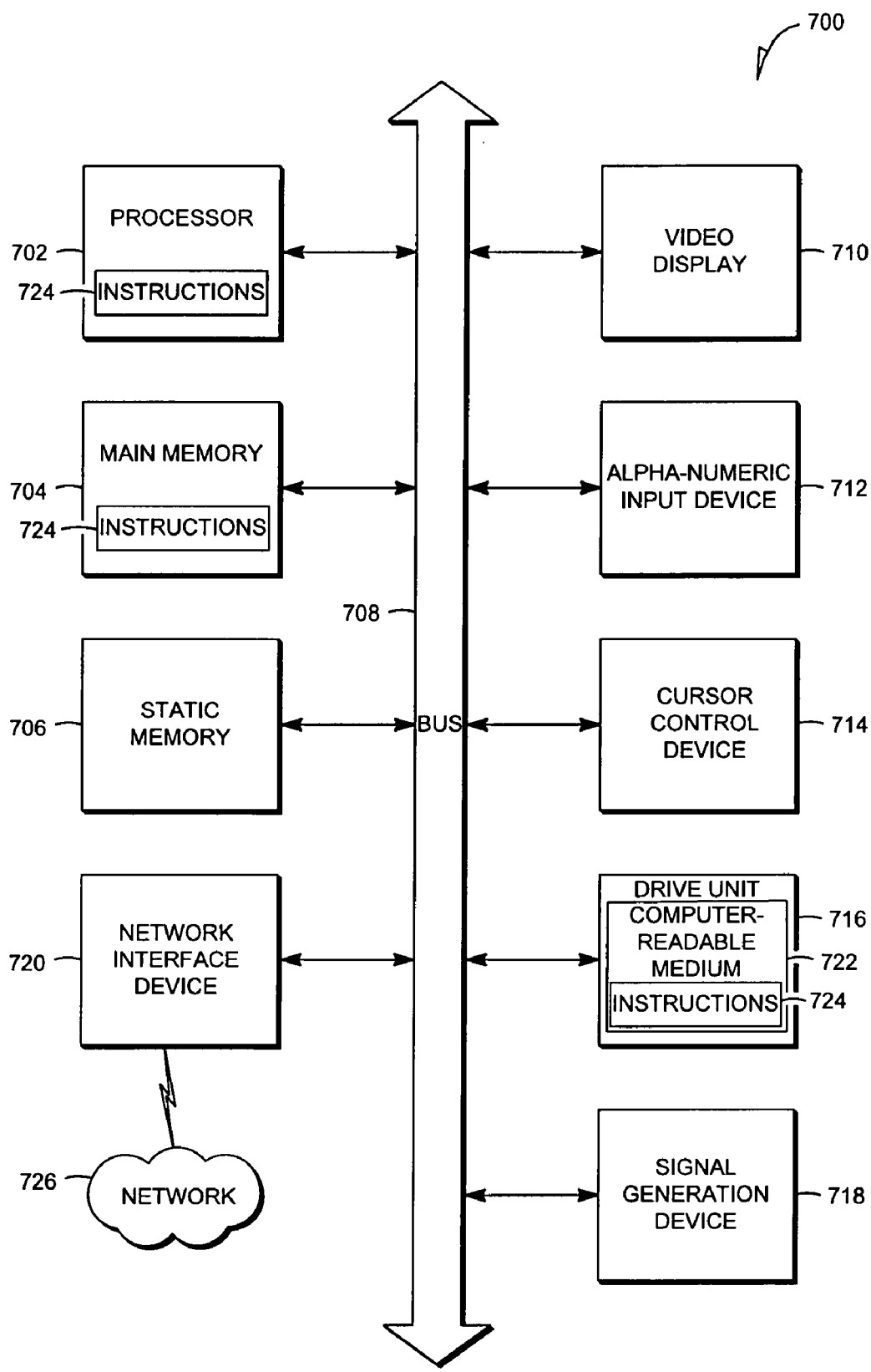
FIG. 7 illustrates a diagrammatic representation of machine in the example form of a computer system within which a set of instructions for causing the machine to perform any one or more of the methodologies discussed herein may be executed.

FIG. 7 shows a diagrammatic representation of machine in the example form of a computer system 700 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing instructions for execution by the machine and that cause the machine to perform any one or more of the methodologies of the present invention, or that is capable of storing a set of instructions.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Although an embodiment of the present invention has been described with reference to specific example embodiments, various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
wirelessly receiving particular video content within a mobile vehicle from a first network data source of a plurality of network data sources within a network and receiving the particular video content within the mobile vehicle from a second network data source of the plurality of network data sources within the network, wherein the particular video content received from the first network data source is received utilizing a first access technology and wherein the particular video content received from the second network data source is received utilizing a second access technology, wherein the particular video content received from the first network data source is the same particular video content received from the second network data source, and wherein the first access technology is different from the second access technology;
buffering the received particular video content from each of the first network data source and second data network source;
provisioning the buffered video content from the first network data source to a receiver device for presentation within the mobile vehicle;
balancing the buffered video content from the first network data source and the buffered video content from the second network data source received utilizing a first access technology to select the buffered video content from the second network data source received via the second access technology based on at least one access factor from the plurality of access technologies;
synchronizing the buffered video content from the first network data source and the buffered video content from the second network data source; and
transitioning the provision of the buffered video content from the first network data source to the receiver device for presentation within the mobile vehicle to the provision of the synchronized buffered video content from the second network data source to the receiver device for presentation within the mobile vehicle.

2. The method of claim 1, wherein wirelessly receiving encrypted video content within a mobile vehicle from a plurality of network data sources within a network comprises:
providing an authentication request to an authentication server; and
wirelessly receiving encrypted video content within the mobile vehicle from the plurality of network data sources within a network.

3. The method of claim 2, wherein providing an authentication request to an authentication server further comprises:
receiving an indication of authentication from the authentication server in response to the authentication request.

4. The method of claim 1, further comprising decrypting selected video content and providing the decrypted video content to the receiver device for presentation.

5. The method of claim 1, further comprising:
wirelessly providing the selected video content to a receiver device for presentation.

6. The method of claim 1, wherein the at least one access factor includes at least one of signal strength indication, capability of the receiver device, and available bandwidth indication.

7. The method of claim 1, wherein the at least one network factor includes at least one of signal strength indication, available bandwidth indication, and proximity indication to a particular network data source.

8. The method of claim 1, wherein provision of video content to a receiver device for presentation comprises:
reducing a number of pixels in the video content; and
providing the reduced video content to a receiver device for presentation.

9. The method of claim 1, wherein the receiver device is at least one of a mobile phone, a television, a personal digital assistant (PDA), or a mobile communications center device.

10. The method of claim 1, wherein the mobile vehicle is an automobile or a boat.

11. A machine-readable memory medium comprising instructions, which when executed by a machine, cause the machine to:
wirelessly receiving particular video content within a mobile vehicle from a first network data source of a plurality of network data sources within a network and receiving the particular video content within the mobile vehicle from a second network data source of the plurality of network data sources within the network, wherein the particular video content received from the first network data source is received utilizing a first access technology and wherein the particular video content received from the second network data source is received utilizing a second access technology, wherein the particular video content received from the first network data source is the same particular video content received from the second network data source, and wherein the first access technology is different from the second access technology;

buffering the received particular video content from each of the first network data source and second data network source;

provisioning the buffered video content from the first network data source to a receiver device for presentation within the mobile vehicle;

balancing the buffered video content from the first network data source and the buffered video content from the second network data source received utilizing a first access technology to select the buffered video content from the second network data source received via the second access technology based on at least one access factor from the plurality of access technologies;

synchronizing the buffered video content from the first network data source and the buffered video content from the second network data source; and transitioning the provision of the buffered video content from the first network data source to the receiver device for presentation within the mobile vehicle to the provision of the synchronized buffered video content from the second network data source to the receiver device for presentation within the mobile vehicle.

12. The machine-readable memory medium of claim 11, wherein to wirelessly receive further includes instructions to:

provide an authentication request to an authentication server;

receive an authentication indication from the authentication server in response to the authentication request; and wirelessly receive encrypted video content within the mobile vehicle from the plurality of network data sources within the network.

13. A system comprising:

a content receiver module to wirelessly receive content within a mobile vehicle from at least a first of a plurality of network data sources and at least a second of the plurality of network data sources within a network, wherein the at least the first of the plurality of network data sources and the at least a second of the plurality of network data sources utilize different access technologies from a plurality of access technologies, wherein the content receiver module wirelessly receives particular video content within the mobile vehicle from a first network data source of a plurality of network data sources within a network and wirelessly receives the particular video content within the mobile vehicle from a second network data source of the plurality of network data sources within the network, wherein the particular video content received from the first network data source is received utilizing a first access technology and wherein the particular video content received from the second network data source is received utilizing a second access technology, wherein the particular video content received from the first network data source is the same particular video content received from the second network data source, and wherein the first access technology is different from the second access technology;

a buffer module to buffer the received content, wherein the buffer module buffers the received particular video content from each of the first network data source and second data network source;

a balancing module to balance the content from the at least the first of the plurality of network data sources and the at least the second of the plurality of network data sources to select the content from the at least the second network data source based on at least one access factor and at least one network factor, wherein the balancing module balances the buffered video content from the first network data source and the buffered video content from the second network data source to select the buffered video content from the second network data source based on at least one access factor from the plurality of access technologies; and a providing module to provide the selected buffered video content to a receiver device for presentation, wherein the providing module transitions the provision of the buffered video content from the first network data source to the receiver device for presentation to the provision of the selected buffered video content from the second network data source to the receiver device for presentation.

14. The system of claim 13, further comprising:
a decryption module to decrypt the received content of the at least one network data source.

15. The system of claim 13, further comprising:
a synchronizing module to synchronize the received content from the at least the first of the plurality of network data sources and the received content from the at least the second of the plurality of network data sources.

16. The system of claim 13, further comprising:
an authentication request module to provide an authentication request to an authentication server; and
an authentication receiver module to receive an indication of authentication from the authentication server in response to the authentication request.

* * * * *